(12) United States Patent  (10) Patent No.: US 8,224,100 B2
Jeong  (45) Date of Patent: Jul. 17, 2012

(54) METHOD AND DEVICE FOR INTRA PREDICTION CODING AND DECODING OF IMAGE

(75) Inventor: Junho Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1159 days.

(21) Appl. No.: 11/637,024

(22) Filed: Dec. 12, 2006

(65) Prior Publication Data

US 2007/0133891 A1  Jun. 14, 2007

(30) Foreign Application Priority Data

Dec. 12, 2005  (KR) .................. 10-2005-0121897

(51) Int. Cl.
*G06K 9/36*  (2006.01)

(52) U.S. Cl. .................. 382/232; 382/236; 382/238

(58) Field of Classification Search .................. 382/232, 382/233, 236, 246; 348/400.1; 375/240.12, 375/240.13, 240.29
See application file for complete search history.

(56) References Cited

U.S. PATENT DOCUMENTS

| 5,534,927 | A * | 7/1996 | Shishikui et al. | 348/400.1 |
| 2004/0184549 | A1 * | 9/2004 | Webb | 375/240.29 |
| 2004/0213348 | A1 * | 10/2004 | Kim et al. | 375/240.12 |
| 2004/0228540 | A1 * | 11/2004 | Chen et al. | 382/246 |
| 2006/0193527 | A1 | 8/2006 | Kalva et al. | |
| 2007/0086663 | A1 | 4/2007 | Lee et al. | |

FOREIGN PATENT DOCUMENTS

| CN | 1662066 A | 8/2005 |
| EP | 1607909 A1 | 12/2005 |
| JP | 2005-151017 A | 6/2005 |
| KR | 1998-025035 A | 7/1998 |
| KR | 10-2001-0073608 A | 8/2001 |
| KR | 10-2003-0025528 A | 3/2003 |
| KR | 10-2004-0032286 A | 4/2004 |
| KR | 10-2004-0093252 A | 11/2004 |
| KR | 10-2006-0008527 A | 1/2006 |

OTHER PUBLICATIONS

"7.13. Activity Classification in Adaptive Transform Coding" In: Rao, et al.: "Discrete Cosine Transform: Algorithms, Advantages, and Applications", Jan. 1, 1990, Academic Press, XP002265979, pp. 292-303.
Shen, et al, "Direct Feature Extraction From Compressed Images", Storage and Retrieval for Still Image and Video Databases 4. San Jose, Feb. 1-2, 1996: [Proceedings of SPIE], Bellingham, SPIE, US, vol. 2670, Feb. 1, 1996, pp. 404-414, XP000642584, ISBN: 978-08194-2044-2.

(Continued)

*Primary Examiner* — Duy M Dang
(74) *Attorney, Agent, or Firm* — Sughrue Mion, PLLC

(57) ABSTRACT

A method and a device for intra prediction coding and decoding of an image in which the intra prediction according to a selected intra prediction mode based on a direction of an input image is performed are provided. In the method and the device, an input block is frequency transformed, a direction of pixels in the input block is determined, and the intra prediction is performed according to an intra prediction mode that has the most similar direction to the determined direction of the pixels.

20 Claims, 9 Drawing Sheets

OTHER PUBLICATIONS

Nguyen, et al., "Efficient Video Transcoding Between H. 263 and H.264/AVC Standards", Conference Proceedings/IEEE International Symposium on Circuits and Systems (ISCAS) : May 23-26, 2005, Kobe, Japan, IEEE Service Center, Piscataway, NJ, May 23, 2005, pp. 904-907, XP010815690, DOI: DOI:10.1109/ISCAS.2005. 1464735, ISBN: 978-0-7803-8834-5.

Lin, et al, "Fast Block Type Decision Algorithm for Intra Prediction in H.264 FRext", International Conference on Image Processing (ICIP) 2005, vol. 1, Sep. 11, 2005, pp. 585-588, XP010850817, DOI: 10.1109/ICIP.2005.1529818, ISBN: 978-0-7803-9134-5.

Communication and Extended European Search Report issued on Apr. 20, 2011 in counterpart European Application No. 06125836.4.

Communication, dated Oct. 4, 2011, issued by the Japanese Patent Office in corresponding Japanese Application No. 2006-333651.

*Complexity Reduction Tools for MPEG-2 to H.264 Video Transcoding*; WSEAS Transactions on Information Science & Applications, vol. 2, Issues, Mar. 2005, pp. 295-300.

*Fast Mode Decision for Intra Prediction*; Joint Video Team (JVT) of ISO/ED MPEG & ITU-T VCEG (ISO/IEC JTC1/SC29/WG11 and ITU-T SG16 Q.6) 7th Meeting: Pattaya II, Thailand, Mar. 7-14, 2003.

\* cited by examiner

DETERMINED DIRECTION

METHOD AND DEVICE FOR INTRA PREDICTION CODING AND DECODING OF IMAGE

CROSS-REFERENCE TO RELATED PATENT APPLICATION

This application claims priority from Korean Patent Application No. 10-2005-0121897 filed on Dec. 12, 2005, in the Korean Intellectual Property Office, the disclosure of which is incorporated herein in its entirety by reference.

BACKGROUND OF THE INVENTION

1. Field of the Invention

Method and apparatuses consistent with the present invention relate to intra prediction of an image, and particularly, intra prediction coding and decoding of an image for improving a coding rate and reducing a complexity of intra prediction by performing the intra prediction according to a selected intra prediction mode based on a direction of an input image.

2. Description of the Related Art

H.264/MPEG-4 advanced video coding (H.264/MPEG-4 AVC), which is a digital video coding standard for achieving very high data compression, adopts various techniques for improving compression rate such as multiple reference motion compensation, loop filtering, variable block size motion compensation, entropy coding such as context-based adaptive binary arithmetic coding (CABAC), and so on.

According to H.264, a picture is divided into macroblocks in order to code the picture. After coding each macroblock in all the available coding modes in inter prediction and intra prediction, the appropriate coding mode for coding macroblock is determined based on a bit-rate of coding the macroblock and a distortion between a decoded macroblock and an original macroblock.

In intra prediction, in order to code a block of a current picture, a reference picture is not used, but a predicted value of a current block to be coded using a spatially neighboring pixel value of the current block is calculated and the difference value between the predicted value and a real pixel value is coded. In this case, intra prediction modes are divided into 4×4 intra prediction modes, 8×8 intra prediction modes (in case of high profile), 16×16 intra prediction modes of a luminance component, and intra prediction modes of a chrominance component.

FIG. 1 shows 16×16 intra prediction modes of a luminance component in accordance with the H.264 standard, and FIG. 2 shows 4×4 intra prediction modes of a luminance component in accordance with the H.264 standard.

Referring to FIG. 1, 16×16 intra prediction modes are divided into four modes including a vertical mode, a horizontal mode, a direct current (DC) mode, and a plane mode. Referring to FIG. 2, 4×4 intra prediction modes are divided into 9 modes including a vertical mode, a horizontal mode, a DC mode, a diagonal down-left mode, a diagonal down-right mode, a vertical right mode, a vertical left mode, a horizontal-up mode, and a horizontal-down mode.

For example, according to Mode 0, that is the vertical mode in FIG. 2, prediction coding of a 4×4 current block is explained. First, pixel values of upward pixels A to D bordering a top row of the 4×4 current block are predicted as pixel values of the 4×4 current block. That is, pixel value A is predicted as four pixel values of the first column of the current block, pixel value B is predicted as four pixel values of the second column of the current block, pixel value C is predicted as four pixel values of the third column of the current block, and pixel value D is predicted as 4 pixel values of the fourth column of the current block. Then, after obtaining the difference values between a 4×4 current block predicted using the pixels A to D and the original 4×4 current block, the difference values are coded.

In coding an image in accordance with the H.264 standard, after coding the current macroblock using 13 modes including the 4×4 intra prediction modes and 16×16 intra prediction modes, intra prediction coding is performed using the mode in which a rate-distortion cost (RD cost) is minimized. Specifically, the 16×16 intra prediction mode in which the RD cost is minimized is selected from the four 16×16 intra prediction modes by performing the four 16×16 intra prediction modes on the current macroblock, and the mode in which the RD cost is minimized for each sub-block is selected by additionally performing the nine 4×4 intra prediction modes in turns for each 4×4 sub-block. Then, the intra prediction mode in which the RD cost is minimized is selected by comparing the RD cost of the selected 16×16 intra prediction mode with the RD cost of the 4×4 intra prediction modes that is the sum of the RD costs of the sub-blocks. Accordingly, in conventional intra prediction coding, there is an associated drawback in that a large number of similar operations are repeated for determining one intra prediction mode. Thus, the compression rate increases, but the number and complexity of operations also increases.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and a device for intra prediction coding and decoding of an image capable of reducing the complexity and amount of calculations in intra prediction by performing the intra prediction only in predetermined intra prediction modes determined by a feature of the input block, instead of performing the intra prediction of all of the predetermined intra prediction modes.

According to an aspect of the present invention, there is provided a method for intra prediction coding of an image including: frequency transforming an input block; determining direction of pixels in the input block using coefficients of the frequency transformed input block; selecting an intra prediction mode which performs intra prediction among the predetermined intra prediction modes using the determined direction of the pixels; and performing the intra prediction for the input block according to the selected intra prediction mode.

According to another aspect of the present invention, there is provided a device for intra prediction coding of an image including: a frequency transformer frequency transforming an input block; a direction determiner determining direction of pixels in the input block using coefficients of the frequency transformed input block; an intra prediction mode candidate selector selecting an intra prediction mode that performs intra prediction among the predetermined intra prediction modes using the determined direction of the pixels; and an intra predictor performing the intra prediction for the input block according to the selected intra prediction mode.

According to another aspect of the present invention, there is provided a method for intra prediction coding of an image including: receiving a bit stream which is intra prediction coded according to a selected intra prediction mode based on determined direction of pixels from coefficients of a frequency transformed input block; determining an intra prediction mode of a current block to be decoded using intra prediction mode information included in a header of the received bit stream; and performing intra prediction decoding according to the determined intra prediction mode.

According to another aspect of the present invention, there is provided a device for intra prediction coding of an image including an intra predictor receiving a bit stream which is intra prediction coded according to a selected intra prediction mode based on determined direction of pixels from coefficients of a frequency transformed input block and performing intra prediction decoding according to the intra prediction mode included in a header of the received bit stream.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF THE
EXEMPLARY EMBODIMENTS OF THE
INVENTION

Hereinafter, exemplary embodiments of the present invention will be described in detail with reference to the accompanying drawings.

Figure 1:
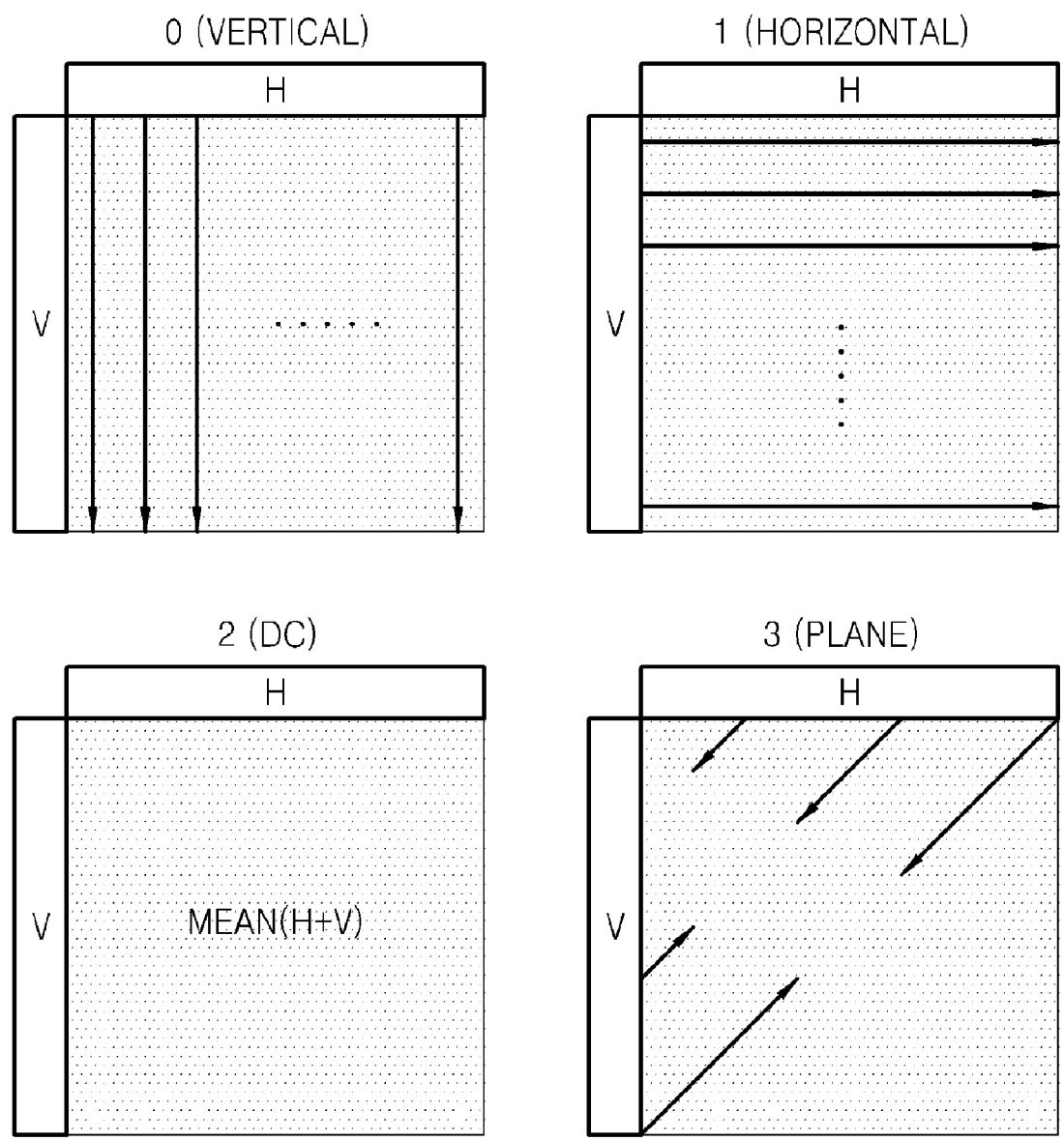
FIG. 1 shows 16×16 intra prediction modes of a luminance component in accordance with the H.264 standard.
Figure 2:
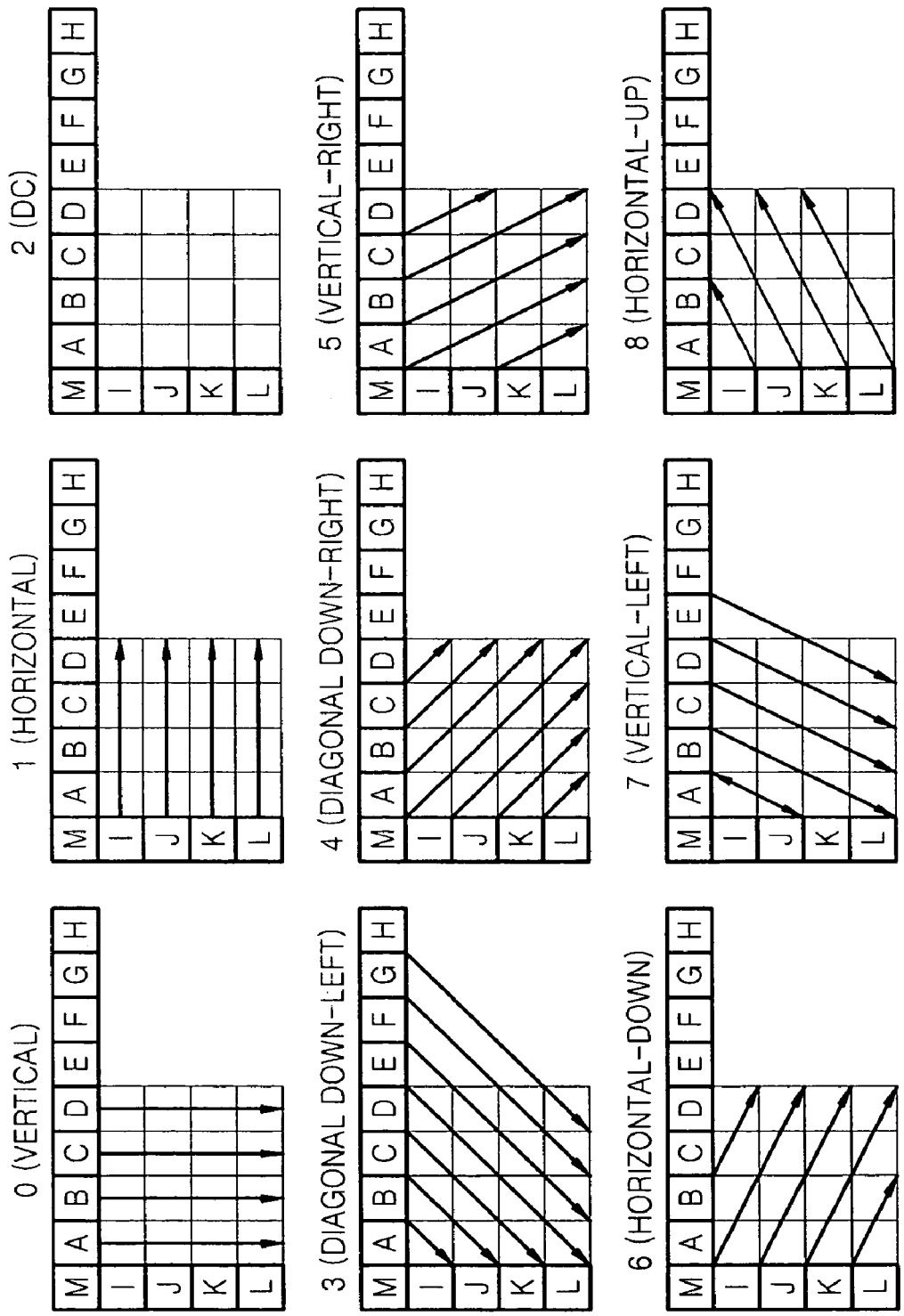
FIG. 2 shows 4×4 intra prediction modes of a luminance component in accordance with the H.264 standard.
Figure 3:
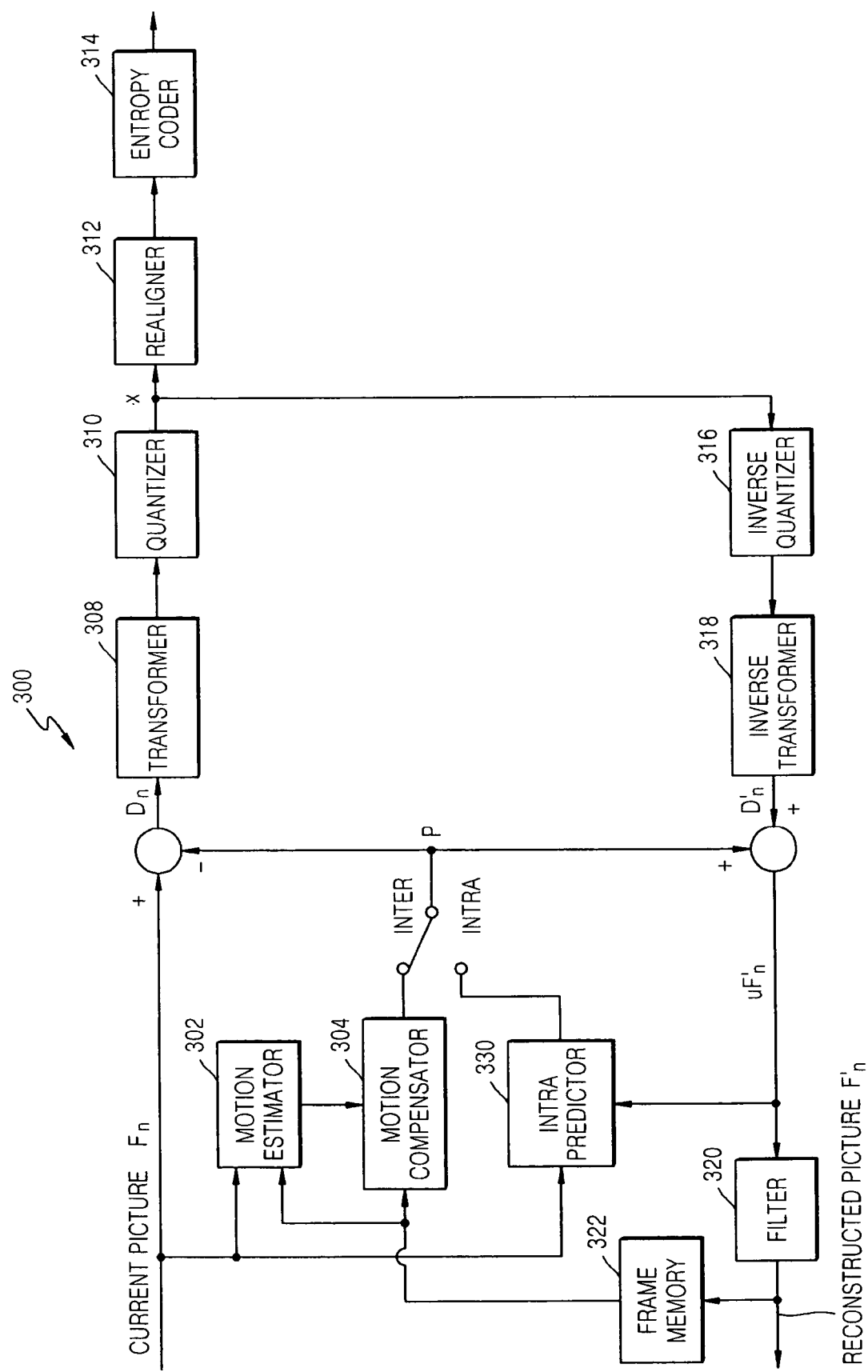
FIG. 3 is a block diagram of an image coding device to which a device for intra prediction coding of an image, according to an exemplary embodiment of the present invention is applied.

FIG. 3 is a block diagram of an image coding device 300 to which a device for intra prediction coding of an image according to an exemplary embodiment of the present invention is applied. Hereinafter, while an intra prediction coding device according to an exemplary embodiment of the present invention is applied to the image coding device in accordance with the H.264 standard for the convenience of explanation, the intra prediction coding device according to an exemplary embodiment of the present invention may be applied to another compression method and standard using intra prediction.

Referring to FIG. 3, the image coding device 300 includes a motion estimator 302, a motion compensator 304, an intra predictor 330, a transformer 308, a quantizer 310, a realigner 312, an entropy coder 314, an inverse quantizer 316, an inverse transformer 318, a filter 320, and a frame memory 322. The intra predictor 330 corresponds to the intra prediction coding device according to an exemplary embodiment of the present invention.

To perform inter prediction, searching a reference picture for the predicted values of a macroblock of the current picture is performed by the motion estimator 302. When a reference block is searched in units of ½ pixels or ¼ pixels, the motion compensator 304 determines data values of the reference block by calculating intermediate pixel values. As described above, inter prediction is performed in the motion estimator 302 and the motion compensator 304.

The intra predictor 330 performs intra prediction by searching the current picture for the predicted block of the current block. As described below, the intra predictor 330 transforms the predetermined sized input block into the frequency domain, selects coefficients that influence a direction of the input block from the coefficients of the frequency transformed input block, and determines the direction of the pixels included in the input block using the selected coefficients. The intra predictor 330 improves the coding rate and reduces complexity by performing the intra prediction only in the intra prediction mode that have the most similar direction to the determined direction of the input block pixels, unlike in conventional methods where the intra prediction is performed for all of the intra prediction modes regardless of features of the input block.

When the inter prediction or intra prediction is performed and the predicted block corresponding to the current input block is formed, the residual between the predicted block and the current input block is calculated. The transformer 308 transforms the residual, and the quantizer 310 quantizes the residual. The quantized residual passes through the realigner 312 so as to be coded in the entropy coder 314. The quantized picture passes through the inverse quantizer 316 and the inverse transformer 318 and thereby reconstructs the current picture to obtain the reference picture to be used for inter prediction. The reconstructed current picture passes through the filter 320 which performs deblocking filtering, and is subsequently stored in the frame memory 322, and is used for inter prediction for the next picture.

Figure 4:
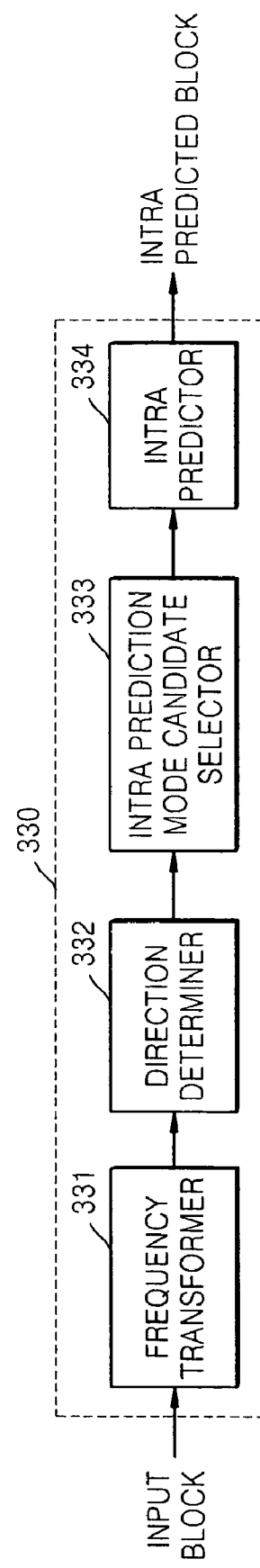
FIG. 4 is a block diagram of an intra prediction unit of an image coding device illustrated in FIG. 3, according to an exemplary embodiment of the present invention.

FIG. 4 is a block diagram of an intra prediction unit 330 of the image coding device 300 illustrated in FIG. 3, according to an exemplary embodiment of the present invention.

Referring to FIG. 4, the intra predictor 330 includes a frequency transformer 331, a direction determiner 332, an intra prediction mode candidate selector 333, and an intra predictor 334.

The frequency transformer 331 performs frequency transformation on a predetermined sized input block. In the exemplary embodiment of the present invention, the frequency transformer 331 frequency transforms the input block using a discrete cosine transform (DCT). As well known in the art, a DCT transformation is a process for decomposing an input image into 2 dimensional frequency components. Assuming that the pixel of the i-th row and the j-th column of an N×N input block is f(i,j), the DCT coefficient of the u-th row and the v-th column of the frequency transformed input block is F(u,v), then the F(u,v) is expressed as the following.

$$F(u, v) = C(u) \cdot C(v) \sum_{x=0}^{N-1} \sum_{y=0}^{N-1} f(x, y) \cos\frac{(2x+1)u\pi}{2N} \cos\frac{(2y+1)v\pi}{2N}$$ [Equation 1]

Here, $$C(u), C(v) = \sqrt{\frac{1}{N}} \text{ (when } u, v \text{ is 0)}, \quad C(u), C(v) = \sqrt{\frac{2}{N}}$$

(when u, v is not 0).

The direction determiner 332 determines the direction of the pixels included in the input block using the coefficients of the frequency transformed input block.

Figure 5:
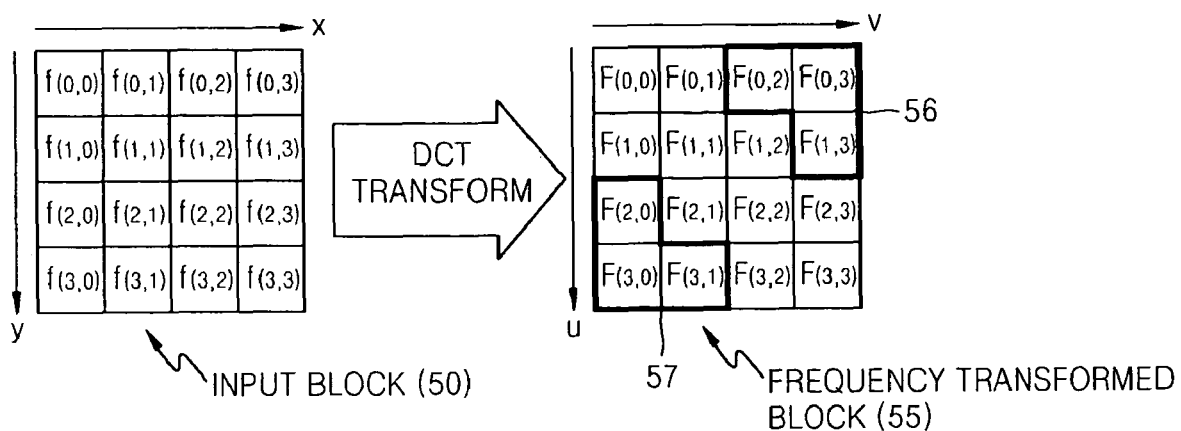
FIG. 5 is a view for explaining a feature of frequency-transformed block coefficients used in a method and a device for intra prediction coding of an image, according to an exemplary embodiment the present invention.
Figure 6:
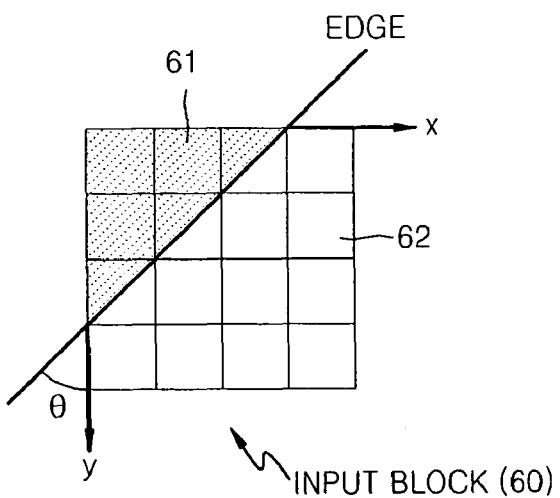
FIG. 6 is a view for explaining a process of determining directions of an input block in a method and a device for intra prediction coding of an image, according to an exemplary embodiment of the present invention.

FIG. 5 is a view for explaining a feature of frequency-transformed block coefficients used in a method and a device for intra prediction coding of an image according to an exemplary embodiment of the present invention, and FIG. 6 is a view for explaining a process for determining the direction of an input block in a method and a device for intra prediction coding of an image according to an exemplary embodiment of the present invention.

Referring to FIG. 5, F(0,0), the coefficient of the first row and the first column of the DCT indicates direct current (DC) components, and the coefficients of the DCT except F(0,0) indicates alternating current (AC) components where the frequencies increase by moving left to right across the row and moving down the column. The DC components represent the average of the pixel values of the input block, and the AC components represent the effect of the edge included in the input block. Referring to FIG. 6, the edge is caused by the difference between the pixel values of the pixels in the input block. In FIG. 6, the input block is divided into two regions by the edge, and the direction of the edge diagonal from bottom left to top right.

As described above, the direction of the pixels in the input block is influenced by the edge part, and the edge part influences the AC components of the frequency transformed block coefficients. Therefore, the direction determiner 332 estimates the edge direction using the coefficients of the AC components. The direction determiner 332 is not influenced much by the low frequency coefficients but by the edge part and determines the direction of the input block using the edge direction. In particular, the direction determiner 332 determines the direction using the ratio of the energy of the coefficients including the edge information of the horizontal direction to the energy of the coefficients including the edge information of the vertical direction among the coefficients of the DCT transformed block transformed by the frequency transformer 331. The edge information of the horizontal direction is reflected in the rightmost and uppermost coefficient of the DCT transformed block and the neighboring coefficients of the rightmost and uppermost coefficient. The edge information of the vertical direction is reflected in the leftmost and lowermost coefficient of the DCT transformed block and the neighboring coefficients of the leftmost and lowermost coefficient. In FIG. 6, when an angle between the vertical direction (y-axis direction) and the direction of the edge is θ, the direction determiner 332 can estimate angle θ using the ratio of the energy of the coefficients including the edge information of the horizontal direction to the energy of the coefficients including the edge information of the vertical direction.

For example, the direction determiner 332 calculates the angle θ which represents the direction of the pixels in the input block 50 using coefficients 56 including the edge information of the horizontal direction which are F(0,2), F(0,3), and F(1,3) and coefficients 57 including the edge information of the vertical direction which are F(2,0), F(3,0), and F(3,1) among the coefficients of a frequency transformed block 55 in FIG. 5 as following equation 2.

$$\theta = \tan^{-1}\left(\frac{F(0, 2)^{2} + F(0, 3)^{2} + F(1, 3)^{2}}{F(2, 0)^{2} + F(3, 0)^{2} + F(3, 1)^{2}}\right)$$ [Equation 2]

In equation 2 above, $$\frac{F(0, 2)^{2} + F(0, 3)^{2} + F(1, 3)^{2}}{F(2, 0)^{2} + F(3, 0)^{2} + F(3, 1)^{2}}$$

represents the ratio of the energy of the coefficients 56 including the edge information of the horizontal direction to the energy of the coefficients 57 including the edge information of the vertical direction, and the arctangent value of the ratio of the energy represents the angle θ representing the direction of the input block 50.

An intra prediction mode candidate selector 333 selects the intra prediction mode that actually performs the intra prediction among the predetermined intra prediction modes based on the directions determined by the direction determiner 332. The intra prediction mode candidate selector 333 selects the intra prediction mode that has the most similar direction to the determined direction according to the size of the input block among the predetermined intra prediction modes, and the intra predictor 334 actually performs the intra prediction according to only the selected intra prediction mode.

Figure 7A:
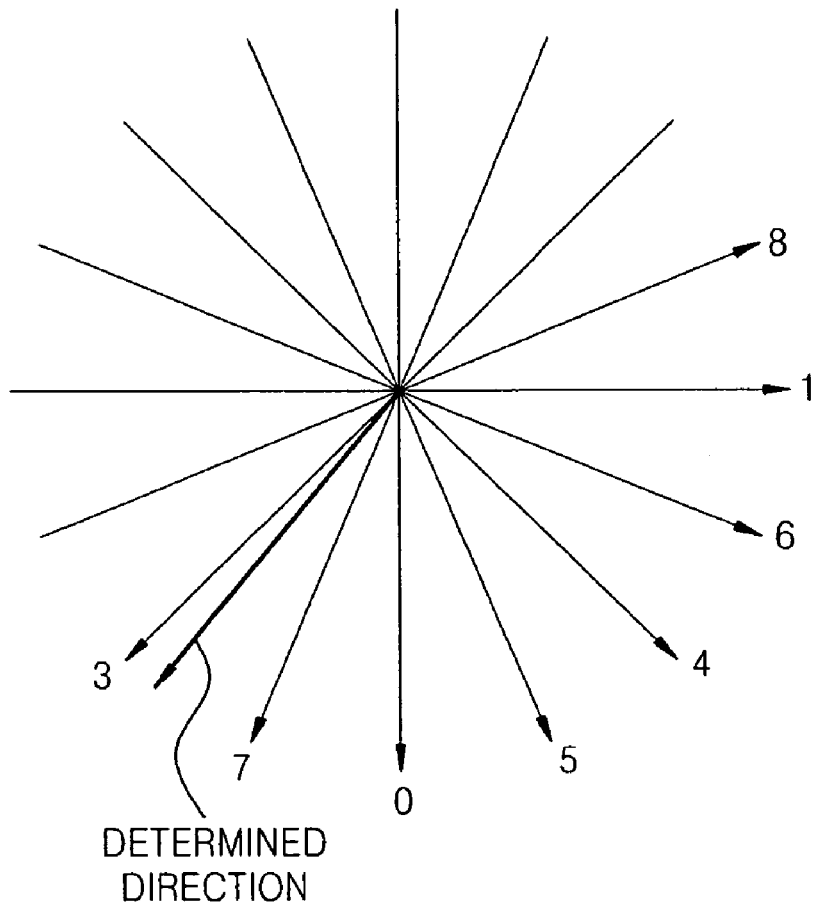
FIGS. 7A and 7B are diagrams for explaining a process of selecting an intra prediction mode in an intra prediction mode candidate selector shown in FIG. 5, according to exemplary embodiments of the present invention.
Figure 7B:
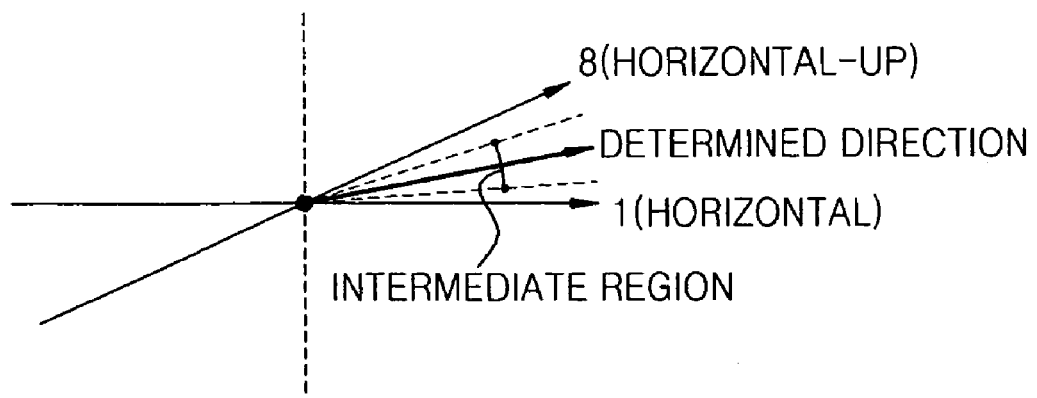

FIGS. 7A and 7B are diagrams for explaining a process of selecting an intra prediction mode in an intra prediction mode candidate selector 333 shown in FIG. 5, according to exemplary embodiments of the present invention.

Referring to FIG. 7A, as described above, 4×4 intra prediction modes according to the H.264 standard include nine intra prediction modes, that is, Modes 0 to 8. When the direction of the input block determined by the direction determiner 332 is closer to Mode 3 than to Mode 7 as shown FIG. 7A, the intra prediction mode candidate selector 333 can select Mode 3 as the intra prediction mode that actually performs the intra prediction. The intra predictor 334 performs the intra prediction according to the selected Mode 3.

In addition, when the determined direction of the input block is located between neighboring intra prediction modes, the intra prediction mode selector 333 can select both of the neighboring intra prediction modes instead of only one of the neighboring intra prediction modes. For example, referring to FIG. 7B, when the determined direction is located in an intermediate region between Mode 8 and Mode 1, the intra prediction mode candidate selector 333 selects both Mode 8 and Mode 1. When the region between the neighboring modes is divided into three sub-regions, the intermediate region corresponds to the middle part of the sub-regions. The three sub-regions may have the same angles, or the intermediate region may have a larger angle than the other sub-regions to improve the compression rate. When the determined direction is located in the intermediate region, the intra prediction is performed according to the two intra prediction modes instead of one intra prediction mode. Coding can be performed faster in case of the intra prediction performed in the selected modes than in the case of the conventional intra prediction performed in all of the nine modes.

As described above, when the intra prediction mode is selected based on only the direction of the input block, the DC mode cannot be selected. Therefore, the intra prediction mode candidate selector 333 calculates the ratio ($D_{DC}$) of the energy of the AC components to the total energy, and when the ratio is less than a predetermined threshold, the DC mode is selected as the intra prediction mode. Specifically, when the size of the input block is m×n, and the u-th (u=0, 1, 2, ..., m) row and the v-th (v=0, 1, 2, ..., n) column of the frequency transformed input block is F(u,v), the ratio of the energy of the AC components to the total energy of the input block can be calculated using the following Equation 3.

$$D_{DC} = \frac{\sum_{v=0}^{n}\sum_{u=0}^{m}\{F(u,v)^2\} - F(0,0)^2}{\sum_{v=0}^{n}\sum_{u=0}^{m}F(u,v)^2}$$ [Equation 3]

When the ratio of the energy of the AC components to the total energy of the input block is small as in the case of an input block with smooth pixel values, it is preferable that the DC mode in which the predicted block is formed through the average value of the input block is selected as opposed to the case where the intra prediction according to a predetermined direction is performed. Therefore, as described above, the intra prediction mode candidate selector 333 can additionally determine whether the selected intra prediction mode is the DC mode.

The intra predictor 334 performs intra prediction for the selected intra prediction mode, and therefore the coding rate is improved. Thus, the complexity of the coding is reduced compared with the conventional case where intra prediction is performed in all of the intra prediction modes regardless of the features of the input block.

Figure 8:
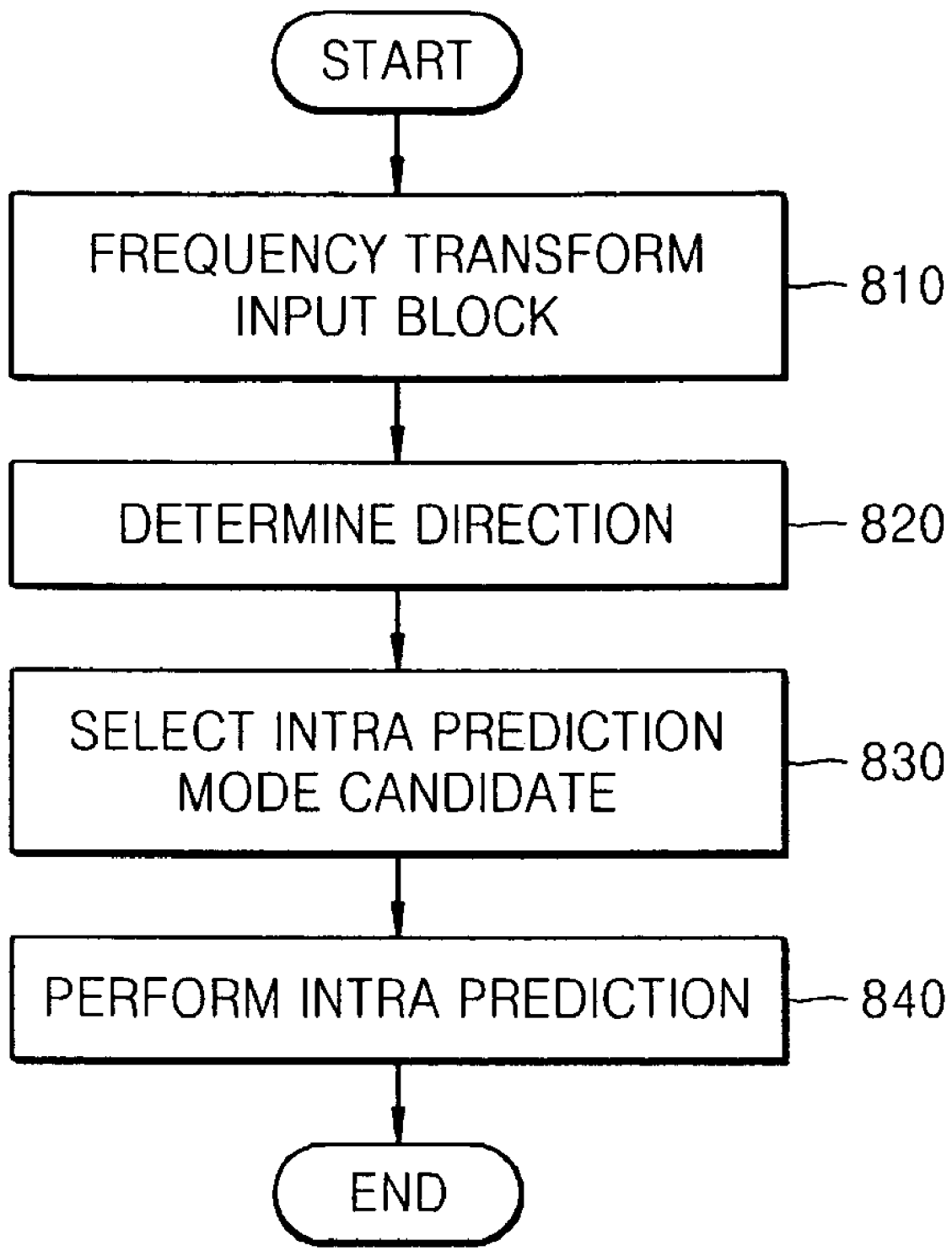
FIG. 8 is a flowchart illustrating a method of intra prediction coding of an image according to an exemplary embodiment of the present invention.

FIG. 8 is a flowchart illustrating a method of intra prediction coding of an image, according to an exemplary embodiment of the present invention.

Referring to FIG. 8, a predetermined sized input block is transformed into the frequency domain using a frequency transform algorithm such as DCT in process 810.

In process 810, the direction of the pixels in the input block is determined by determining the edge direction included in the input block using the ratio of the energy of the coefficients including the edge information of the horizontal direction to the energy of the coefficients including the edge information of the vertical direction among the coefficients of the frequency transformed input block. As described above, the rightmost and uppermost coefficient of the DCT transformed block and the neighboring coefficients of the rightmost and uppermost coefficient include the edge information of the horizontal direction, and the leftmost and lowermost coefficient of the neighboring coefficients of the leftmost and lowermost coefficient include the edge information of the vertical direction. Therefore, the direction of the input block is determined using the ratio of the energy of the coefficients including the edge information of the horizontal direction to the energy of the coefficients including the edge information of the vertical direction.

In process 830, the intra prediction mode which has the most similar direction to the determined direction is selected. An image compression standard such as H.264 includes predetermined intra prediction modes according to the size of the input block. According to an exemplary embodiment of the present invention, one or more intra prediction modes that have the most similar direction to the determined direction are selected among the plurality of the intra prediction modes.

In process 840, intra prediction is performed according to only the selected intra prediction modes instead of all the available intra prediction modes. This can lead to an improved intra prediction coding rate and a reduced number of intra prediction operations.

The determined intra prediction mode information is included in a bit stream header as mode information and transmitted to a decoder. The decoder receiving the bit stream determines the intra prediction mode using the mode information and performs intra prediction decoding.

Figure 9:
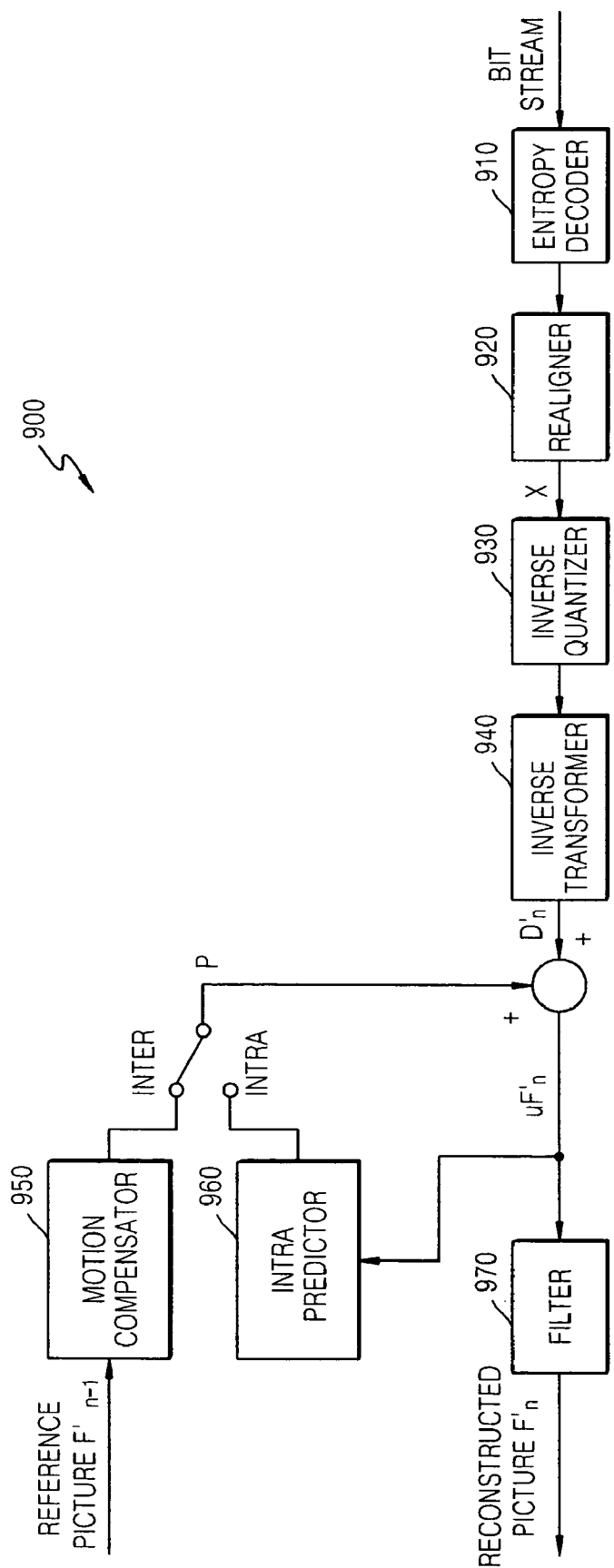
FIG. 9 is a block diagram of an image decoding device to which a device for intra prediction decoding of an image is applied, according to an exemplary embodiment of the present invention.

FIG. 9 is a block diagram of an image decoding device 900 to which a device for intra prediction decoding of an image is applied, according to an exemplary embodiment of the present invention.

Referring to FIG. 9, the image decoding device 900 includes an entropy decoder 910, a realigner 920, an inverse quantizer 930, an inverse transformer 940, a motion compensator 950, an intra predictor 960, and a filter 970. The intra predictor 960 corresponds to the intra prediction decoder according to an exemplary embodiment the present invention.

The entropy decoder 910 and the realigner 920 receive the compressed bit stream, perform entropy decoding, and extract the intra prediction mode information and the quantized coefficient information. The inverse quantizer 930 and the inverse transformer 940 extract transform coefficients, motion vector information, header information, and intra prediction mode information by performing an inverse transform and an inverse quantization with respect to the extracted intra prediction mode information and the quantized coefficients. The motion compensator 950 and the intra predictor 960 generate the predicted block according to the coded picture type using the decoded header information. The predicted block is added to $D'_n$ which represents an error value to generate $uF'_n$. The $uF'_n$ passes through the filter 970 to generate the reconstructed picture $uF'_n$.

Figure 10:
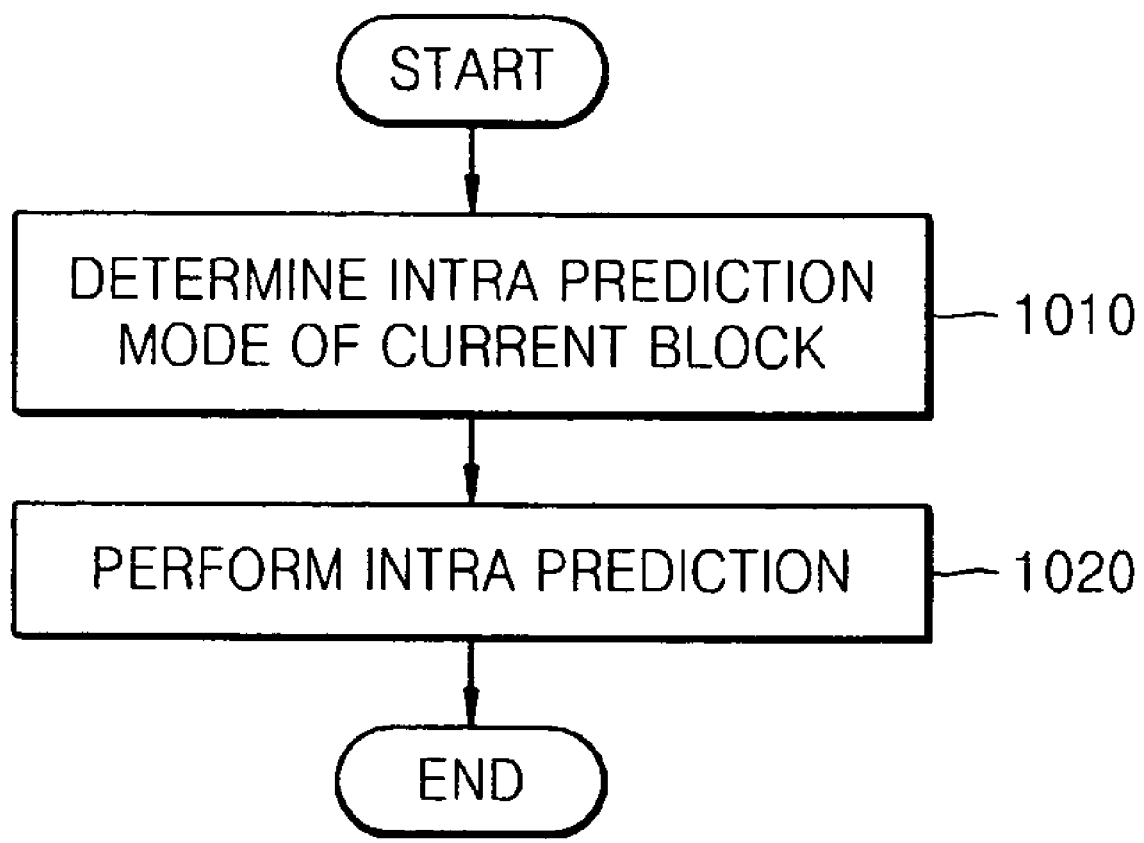
FIG. 10 is a flowchart illustrating a method of intra prediction decoding of an image according to an exemplary embodiment of the present invention.

FIG. 10 is a flowchart illustrating a method of intra prediction decoding of an image according to an exemplary embodiment of the present invention.

In process 1010, a bit stream which is coded using the intra prediction coding method according to an exemplary embodiment of the present invention is received, and the intra prediction mode of the current input block to be decoded using the intra prediction mode information included in the header of the bit stream is determined.

In process 1020, the predicted block corresponding to the current block is generated by performing intra prediction according to the determined intra prediction mode information, and is added to the residual value included in the predicted block and the bit stream to reconstruct the current block.

The method of intra prediction coding of an image according to the exemplary embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, according to the exemplary embodiment of the present invention, the performance of real time image compression is maintained by reducing the amount of calculations, and the performance of real time processing of the image is improved by enhancing the calculation speed. For example, an efficient streaming service can be embodied by enhancing the intra prediction speed when coding the image in real time Internet streaming.

What is claimed is:

1. A method of intra prediction coding of an image, the method comprising:
using a processor to perform the steps comprising:
frequency transforming an input block;
determining a direction of pixels in the input block using coefficients of the frequency transformed input block;
selecting an intra prediction mode that performs intra prediction among a plurality of intra prediction modes based on the determined direction of the pixels; and
performing intra prediction for the input block according to the selected intra prediction mode,
wherein in the determining the direction of the pixels, the direction of the pixels is determined using an edge direction calculated from a ratio of energy of coefficients including edge information of a horizontal direction to energy of coefficients including edge information of a vertical direction.

2. The method of claim 1, wherein the frequency transforming comprises performing a discrete cosine transform on the input block.

3. The method of claim 1, wherein the coefficients having the edge information of the horizontal direction include a rightmost and uppermost coefficient of the frequency transformed block and neighboring coefficients of the rightmost and uppermost coefficient, and the coefficients having the edge information of the vertical direction include a leftmost and lowermost coefficient of the frequency transformed block and neighboring coefficients of the leftmost and lowermost coefficient.

4. The method of claim 1, wherein, if the ratio of the energy is R, and an angle between the vertical direction of the input block and the edge direction in the input block is θ, R={(squared sum of the coefficients including the edge information of the horizontal direction)/(squared sum of the coefficients including the edge information of the vertical direction)} and the θ=tan$^{-1}$ R.

5. The method of claim 4, wherein, if a size of the input block is 4×4, and the coefficient of a u-th (u=0, 1, 2, . . . , m) row and a v-th (v=0, 1, 2, . . . , m) column of the frequency transformed input block is F(u,v), and the angle θ between the vertical direction and the edge direction is calculated by $$\theta = \tan^{-1}\left(\frac{F(0, 2)^2 + F(0, 3)^2 + F(1, 3)^2}{F(2, 0)^2 + F(3, 0)^2 + F(3, 1)^2}\right).$$

6. The method of claim 1, wherein, the selecting the intra prediction mode comprises selecting the intra prediction mode that has a most similar direction to the determined direction.

7. The method of claim 1, wherein the selecting the intra prediction mode comprises selecting both neighboring intra prediction modes if the determined direction is located in an intermediate region between the neighboring intra prediction modes.

8. The method of claim 1, wherein the selecting the intra prediction mode comprises calculating a ratio of energy of alternating current components to a total energy and selecting a direct current mode as an intra prediction mode candidate if the ratio is less than a predetermined threshold.

9. The method of claim 8, wherein, if a size of the input block is m×n, and a u-th (u=0, 1, 2, . . . , m) row and a v-th (v=0, 1, 2, . . . , m) column of the frequency transformed input block is F(u,v), a ratio (D$_{DC}$) is calculated by $$D_{DC} = \frac{\sum_{v=0}^{n}\sum_{u=0}^{m}\{F(u, v)^2\} - F(0, 0)^2}{\sum_{v=0}^{n}\sum_{u=0}^{m}F(u, v)^2}.$$

10. The method of claim 1, wherein the selected intra prediction mode is based on an H.264 standard.

11. A device for intra prediction coding of an image, the device comprising:
a processor, the processor comprising:
a frequency transformer which frequency transforms an input block;
a direction determiner which determines a direction of pixels in the input block using coefficients of the frequency transformed input block;
an intra prediction mode candidate selector which selects an intra prediction mode which performs intra prediction among a plurality of intra prediction modes based on the determined direction of the pixels; and
an intra predictor which performs intra prediction for the input block according to the selected intra prediction mode,
wherein the direction determiner determines the direction of the pixels using an edge direction calculated from a ratio of energy of coefficients including edge information of a horizontal direction to energy of coefficients including edge information of a vertical direction.

12. The device of claim 11, wherein the frequency transformer performs a discrete cosine transform on the input block.

13. The device of claim 11, wherein the coefficients having the edge information of the horizontal direction include a rightmost and uppermost coefficient of the frequency transformed block and neighboring coefficients of the rightmost and uppermost coefficient, and the coefficients having the edge information of the vertical direction include a leftmost and lowermost coefficient of the frequency transformed block and neighboring coefficients of the leftmost and lowermost coefficient.

14. The device of claim 11, wherein, if the ratio of the energy is R, and an angle between the vertical direction of the input block and the edge direction in the input block is θ, R={(squared sum of the coefficients including the edge information of the horizontal direction)/(squared sum of the coefficients including the edge information of the vertical direction)} and the θ=tan$^{-1}$ R.

15. The device of claim 14, wherein if the size of the input block is 4×4, and the coefficient of a u-th (u=0, 1, 2, ..., m) row and a v-th (v=0, 1, 2, ..., m) column of the frequency transformed input block is F(u,v), and the angle θ between the vertical direction and the edge direction is calculated by $$\theta = \tan^{-1}\left(\frac{F(0, 2)^2 + F(0, 3)^2 + F(1, 3)^2}{F(2, 0)^2 + F(3, 0)^2 + F(3, 1)^2}\right).$$

16. The device of claim 11, wherein the intra prediction mode candidate selector selects the intra prediction mode that has a most similar direction to the determined direction.

17. The device of claim 11, wherein the intra prediction mode candidate selector selects both neighboring intra prediction modes if the determined direction is located in an intermediate region between the neighboring intra prediction modes.

18. The device of claim 11, wherein the intra prediction mode candidate selector calculates a ratio of energy of alternating current components to a total energy and selects a direct current mode as an intra prediction mode candidate if the ratio is less than a threshold.

19. The device of claim 18, wherein if a size of the input block is m×n, and a u-th (u=0, 1, 2, ..., m) row and a v-th (v=0, 1, 2, ..., m) column of the frequency transformed input block is F(u,v), a ratio ($D_{DC}$) is calculated by $$D_{DC} = \frac{\sum_{v=0}^{n}\sum_{u=0}^{m}\{F(u, v)^2\} - F(0, 0)^2}{\sum_{v=0}^{n}\sum_{u=0}^{m}F(u, v)^2}.$$

20. The device of claim 11, wherein the selected intra prediction mode is based on an H.264 standard.

* * * * *